United States Patent [19]

Nath

[11] 3,878,119

[45] Apr. 15, 1975

[54] PREPARATION OF RARE-EARTH OXYSULFIDE PHOSPHORS

[75] Inventor: Dilip K. Nath, Mayfield, Ohio

[73] Assignee: General Electric Company, Schenectady, N.Y.

[22] Filed: Dec. 26, 1972

[21] Appl. No.: 318,171

[52] U.S. Cl. ......................................... 252/301.4 S
[51] Int. Cl. .............................................. C09k 1/14
[58] Field of Search ............ 252/301.4 S, 301.4 R; 117/100 B

[56] References Cited
UNITED STATES PATENTS

| | | | |
|---|---|---|---|
| 3,418,247 | 12/1968 | Yocom | 252/301.4 S |
| 3,457,184 | 7/1969 | Kobayashi et al. | 252/301.4 R |
| 3,502,590 | 3/1970 | Royce et al. | 252/301.4 S |
| 3,647,707 | 3/1972 | Gillooly et al. | 252/301.4 S |
| 3,650,975 | 3/1972 | Yale | 252/301.4 R |
| 3,721,630 | 3/1973 | Mehalchick et al. | 252/301.4 S |
| 3,759,835 | 9/1973 | Mehalchick | 252/301.4 R |

*Primary Examiner*—Jack Cooper
*Attorney, Agent, or Firm*—John F. McDevitt; Lawrence R. Kempton; Frank L. Neuhauser

[57] ABSTRACT

Rare-earth oxysulfide luminescent materials are recrystallized by liquid phase sintering in a vitreous flux. The vitreous flux composition is the heat reaction product of one or more alkali metal ions selected from the group consisting of lithium, sodium, and potassium with an oxide selected from the group consisting of $SiO_2$, $GeO_2$, and $B_2O_3$, including mixtures thereof. Various methods of preparation can be used which includes firing a preformed vitreous flux with the oxysulfide phosphor crystals as well as converting a rare-earth oxide mixture with a sulfurizing agent to oxysulfide phosphor crystals in the presence of source materials for the vitreous flux and thereafter recrystallizing the phosphor crystals in the vitreous flux which is formed in situ.

4 Claims, No Drawings

PREPARATION OF RARE-EARTH OXYSULFIDE PHOSPHORS

BACKGROUND OF THE INVENTION

The present invention deals with an improved class of the rare-earth oxysulfide luminescent materials and the various methods by which said luminescent materials can be prepared having improved utilization characteristics.

Rare-earth oxysulfide luminescent materials such as $Y_2O_2S$:Eu (yttrium oxysulfide activated with europium) have previously been produced by various processes including single-step and multi-step processes. Generally, a mixture of the rare-earth oxides is heated with a sulfurizing agent such as $H_2S$ or an alkali metal sulfide to form the oxysulfide phosphor which can thereafter be recrystallized to provide greater uniformity and distribution in particle size of the phosphor crystals by additional heating in a liquid phase sintering medium. In the existing conventional process, the recrystallization takes place from a molten flux bath consisting of a large volume of liquid. The liquid is essentially one or more combinations of molten alkali metal sulfides and polysulfides. From a practical point of view, the existing process has a number of serious disadvantages. There is a low yield per feed volume which further requires rigorous washing steps to remove the residual fluxing materials and a greater possibility of contamination if all the residue is not removed. There is also corrosion of the containers employed to conduct the recrystallization due to high reactivity of molten alkali sulfides with the container material. The pyrophoric nature of alkali sulfides also causes serious handling problems from the hazards of handling such materials.

In the conventional method of preparation, there is an excessive variation in particle size of the phosphor crystals which requires further processing to remove material not in conformity with size specifications and yields of 50% or less are often obtained. The existing processes also have not resulted in a desired degree of crystallinity of the correct phosphor composition without contamination so as to exhibit optimum emission behavior. It would be of considerable benefit, therefore, to provide an improved class of rare-earth oxysulfide materials along with improved methods for their preparation.

SUMMARY OF THE INVENTION

It has now been discovered that a variety of rare-earth oxysulfide phosphors can be prepared readily with uniform particle size, higher efficiency, and without removing the fluxing agent.

The general method of preparation herein employed utilizes a vitreous flux produced by heating an alkali metal ion selected from the group consisting of lithium, sodium, and potassium with an oxide selected from the group consisting of $SiO_2$, $GeO_2$, and $B_2O_3$ to form a heat reaction product containing a vitreous phase. By "vitreous flux" is meant a material having one or more glass phases and which can contain one or more crystalline phases in equillibrium with the glass portion of the material. The present vitreous flux compositions can further be represented as either binary or ternary oxide phase systems having chemical compositions within the limits fixed by a molar ratio between the alkali metal ion and each oxide in the flux which ranges from 0.5 to 1.0 and 1.0 to 0.5. Certain alkali borosilicate fluxing materials are disclosed in pending U.S. Pat. application, Ser. No. 149,456, filed Feb. 12, 1971 in the names of D. K. Nath and J. R. Wolk, entitled "Product and Process for Europium-Activated Rare-Earth Phosphor" and assigned to the assignee of the present invention. Certain alkali borogermanate flux materials are also disclosed in my pending U.S. Pat. application, Ser. No. 279,346, filed Aug. 10, 1972, and entitled, "Product and Processes for Europium-Activated Rare-Earth Phosphor," which is also assigned to the assignee of the present invention. The present rare-earth oxysulfide phosphors can be prepared directly by heating a mixture of the individual phosphor crystals with a preformed vitreous flux to the correct firing temperatures or comparable results can be achieved under the same firing conditions if the phosphor crystals are heated with the constituent materials which form the vitreous flux. In still a different general method of preparation a mixture of rare-earth oxides is blended with the preformed vitreous flux or its constituent materials and the blended product, then heated in the presence of a sulfurizing agent for conversion of the rare-earth oxide mixture to the oxysulfide phosphor which can then be recrystallized by additional heating in the same flux medium. The efficiency of employing the present phosphors in cathode ray applications has been found superior to oxysulfide phosphors prepared with the conventional fluxing agents and the proportion of the vitreous flux in the present phosphors while generally of lesser proportion than when using conventional fluxing agents can be varied over a wide range to control particle size and brightness of the phosphors as well as temperatures of preparation, amount of oversize and elimination of attack upon container materials employed for the preparation.

Briefly stated, the present invention provides an improved class of rare-earth oxysulfide luminescent materials which comprises individual phosphor crystals having the following chemical composition:

$$Ln_{(2-x)}Ln'_xO_2S$$

wherein Ln is one or more of Y, Gd, La, and Lu, and Ln' is one or more of Dy, Er, Eu, Ho, Nd, Pr, Sm, Tb, and Tm, and  x can range at least from 0.0002 to 0.2 with about 0.03 to 0.05 being preferred, and which contains a vitreous flux uniformly dispersed with said phosphor crystals which is produced by heating an alkali metal ion selected from the group consisting of lithium, sodium, and potassium with an oxide selected from the group consisting of $SiO_2$, $GeO_2$, and $B_2O_3$, including mixtures thereof. As in conventional phosphor nomenclature, the element or elements identified after the colon in the above recited chemical formula representing the phosphor compositions of the present invention is the activator element. Unless indicated otherwise, the activator is incorporated in the host lattice in partial substitution for one of the constituents. In these cases, the rare-earth activator substitutes for proportional quantities of the rare-earth of the oxysulfide host. For instance, such a phosphor containing 5% Eu as an activator would have the Eu substituted for 5% of the Ln. In the present invention, the rare-earth oxysulfide luminescent materials including $Gd_2O_2S$:Eu, $Gd_2O_2S$:Tb, $La_2O_2S$:Tb, $La_2O_2S$:Eu, $Y_2O_2S$:Eu and/or Tb are made by converting rare-earth oxide mixtures to rare-earth oxysulfides by any suitable sulfurizing method followed by recrystallization in the present vitreous fluxing medium. Improved phosphors can be prepared by using as low as 0.1 weight percent of the fluxing medium with respect to 99.9 weight percent of the rare-earth oxysulfide phosphor with the most effective amount of the fluxing medium being found to be approximately 0.5 weight percent of the rare-earth oxysulfide phosphor. The amount of fluxing medium can be increased, in some instances, up to approximately 7 weight percent of the rare-earth oxysulfide phosphor, but usually above 3 weight percent, there is no additional gain in brightness of the final product.

Because of the commercial interest in $Y_2O_2S$:Eu, detailed examples will be given for the application of the present invention primary to that phosphor. Also, unless otherwise specified, percentages and proportions recited in the following preferred embodiments are given in molar quantities.

DESCRIPTION OF THE PREFERRED EMBODIMENTS

Starting materials for a rare-earth oxide mixture employed to prepare the improved oxysulfide phosphor products of the present invention may consist of the oxides directly or any salts of a rare-earth ion which can be decomposed to form the oxides or converted into oxides by such conventional techniques as chemical reaction and the like. Thus, it is contemplated to employ starting materials in the form of homogeneous mixtures or coprecipitated slurries of rare-earth metal salts such as oxalates from which the rare-earth oxides are prepared. The vitreous flux can also be prepared from a variety of starting materials such as a mixture of alkali metal, boron, and silicon compounds which will ultimately produce the alkali metal oxide, boron oxide, and silicon dioxide constituents in the flux to the extent present. While the preferred fluxing medium generally contains but a single alkali metal ion, it is further contemplated to employ a variety of binary and tenary phase flux systems including $Li_2O-SiO_2$, $Li_2O-GeO_2$, $Li_2O-B_2O_3$, $Li_2O-B_2O_3-SiO_2$, $Li_2O-B_2O_3-GeO_2$, $Na_2O-SiO_2$, $Na_2O-GeO_2$, $Na_2O-B_2O_3$, $Na_2O-B_2O_3-SiO_2$, $Na_2O-B_2O_3-GeO_2$, $K_2O-SiO_2$, $K_2O-GeO_2$, $K_2O-B_2O_3$, $K_2O-B_2O_3-SiO_2$, and $K_2O-B_2O_3-GeO_2$ insofar as limited by the molar proportions hereinbefore recited to form the desired vitreous flux material. Of these exemplary binary and ternary flux systems, the brightest phosphors and most desirable crystal growth have been obtained by using one or a mixture of the following flux systems: $Li_2O-SiO_2$, $Li_2O-GeO_2$, $Li_2O-B_2O_3$, $Na_2O-B_2O_3$, $K_2O-B_2O_3$, $Li_2O-B_2O_3-SiO_2$, and $Li_2O-B_2O_3-GeO_2$. A further comparison of the effectiveness of the preferred flux system finds the median particle size of a final yttrium oxysulfide phosphor activated with europium to be 13.2 microns with a lithium borate flux, whereas the median particle size was found to be approximately 10.2–11.2 micron size with lithium silicate, lithium germanate, lithium borosilicate, and lithium borogermanate when the growth of the phosphor particles is compared on the basis of 1 weight percent of the sintering media being employed.

In a preferred process of preparation, the rare-earth oxide sources which can be coprecipitated oxalates of the activator and host rare-earth ions is first decomposed to form the rare-earth oxides by heating in air or other oxidizing atmosphere to temperatures in the range 500°C–1000°C as a preliminary step to conversion of the host rare-earth ion to the oxysulfide. The rare-earth oxide mixture is subsequently heated in a current of inert gas such as nitrogen to elevated temperatures in the range from about 700°C–1000°C, preferably around 870°C–900°C, for approximately one (1) hour while a stream of $H_2S$ gas is passed along with the flowing nitrogen. The amount of $H_2S$ will usually be about twice the theoretical amount for conversion of the rare-earth host oxide to the oxysulfide, depending on the furnace geometry and construction. It will also be appreciated that conversion of the rare-earth host oxide to an oxysulfide can be achieved by other suitable methods, for example, by the use of gaseous sulfur or molten KSH in an inert atmosphere. The rare-earth oxysulfide material can then be mixed with either a preformed vitreous flux or source materials for the vitreous flux in order to carry out the recrystallization step. A preformed vitreous flux of the present invention can be prepared by heating the source materials at a temperature of about 500°C or higher in air for a suitable period of time to form a homogeneous melt of the constituents. Depending on the temperature and time of heating during the flux preformation process, the flux may form a final structure which is either predominantly crystalline or glassy and which can be broken mechanically to a fine powder for blending with the rare-earth oxysulfide material. The blend of the rare-earth oxysulfide with the powdered flux is then heated in an inert atmosphere above 900°C, preferably between 1000°C and 1350°C or higher for a period of about one (1) hour or longer in order to sinter and recrystallize the rare-earth oxysulfide phosphor. The recrystallized material is then allowed to cool in a current of inert gases until it is sufficiently cold to be removed from the furnace as a final product. A lithium borosilicate flux was found to provide the glassy coating on the oxysulfide phosphor crystal particles and an extremely uniform phosphor particle size was obtained. Also, in general, the rare-earth oxysulfide phosphor prepared by using a vitreous flux selected from the ternarary phase systems such as alkali metal borosilicates or alkali metal borogermanates have high fluorescent brightness without need for any washing procedures whereas the binary phase fluxes requires some washing of the product with water to provide a neutral pH before equivalent brightness is obtained.

In another method of this invention, the rare-earth oxides obtained by igniting the coprecipitated oxalates of the host and activator rare-earth ions are mixed with the preformed vitreous flux or a mixture of the flux constituents in air to 700°C–900°C and at that temperature sufficient nitrogen or an inert gas is passed to displace all air from the furnace. A stream of gaseous $H_2S$ or sulfur is then passed to sulfurize the rare-earth oxides to rare-earth oxysulfide phosphor. After the sulfurization has been completed, the flow of sulfur gas or $H_2S$ is stopped and the temperature of the furnace is raised to 1000°C–1350°C or higher for a period of time sufficient to sinter and recrystallize the rare-earth oxysulfide phosphor.

The following specific examples are provided to illustrate in detail the practice of the present invention and the results obtained therewith.

EXAMPLE I

A batch of 9.99 grams of $Y_2O_2S$:.045 Eu (.045 mole of Eu and .955 mole Y) prepared by the method above described is blended with 0.1 gram of $Li_2GeO_3$ or 0.05 gram of $Li_2CO_3$ and 0.08 gram of $GeO_2$. The mixture is then heated in an inert atmosphere such as $N_2$ by gradually raising the temperature of the furnace from or below 400°C to 1180°C and holding the furnace at that temperature for four (4) hours. After that, the furnace is cooled down to room temperature in flowing $N_2$. The cold sintered product is ground and washed with hot deionized water until a neutral pH is obtained. It is then dried and sifted through a 400 mesh screen to provide the final product. A series of tests were conducted upon this phosphor embodiment wherein the same method of preparation was employed for substitution of various amount of the lithium germanate flux including one preparation which excluded the flux. Brightness measurements were conducted upon the phosphor products in which the measurement obtained upon the phosphor prepared without flux was rated at 100% brightness. The brightness data was obtained by measuring the phosphor in a demountable cathode ray tube at 20 Kv and 19 microamps/35 $Cm^2$ beam current. The results of the brightness test are reported below in Table I.

TABLE I

| Lithium Germanate (Weight %) | Median Size in Micron | Brightness (%) |
|---|---|---|
| 0.1 | 8.1 | 131 |
| 0.5 | 9.2 | 149 |
| 1.0 | 10.5 | 140 |
| 2.0 | 11.2 | 138 |
| 3.0 | 11.7 | 137 |
| 5.0 | 13.2 | 134 |

EXAMPLE II

The same procedure is followed as in Example I except that varying quantities of $Li_2SiO_3$ are added instead of lithium germanate. The results are listed below in Table II.

TABLE II

| Lithium Silicate (Weight %) | Median Size in Micron | Brightness (%) |
|---|---|---|
| 0.1 | 8.4 | 136 |
| 0.5 | 9.9 | 144 |
| 1.0 | 10.2 | 146 |
| 2.0 | 10.9 | 144 |
| 3.0 | 11.8 | 141 |
| 5.0 | 14.3 | 137 |

EXAMPLE III

The general procedure of Example I is followed except that varying quantities of $Li_2O-B_2O_3-SiO_2$ are added in place of lithium germanate and the process is carried out at 1150°C instead of 1180°C. Additionally, the brightness measurements were conducted on the phosphor product without the washing step utilized in Example I. The brightness results are reported below in Table III.

TABLE III

| Lithium Borosilicate (Weight %) | Median Size in Micron | Brightness (%) |
|---|---|---|
| 0.1 | 8.8 | 132 |
| .5 | 10.5 | 140 |
| 1.0 | 11.2 | 141 |
| 2.0 | 12.1 | 135 |
| 3.0 | 12.9 | 129 |
| 5.0 | 14.3 | 107 |

EXAMPLE IV

The same procedure is followed as in Example III except that varying quantities of $Li_2O-B_2O_3-GeO$ are added instead of lithium borosilicate. The brightness results are reported below in Table IV on the unwashed phosphor products.

TABLE IV

| Lithium Borogermanate (Weight %) | Median Size in Micron | Brightness (%) |
|---|---|---|
| 0.1 | 8.4 | 128 |
| 0.5 | 10.2 | 138 |
| 1.0 | 11.1 | 135 |
| 2.0 | 12.0 | 124 |
| 3.0 | 12.8 | 118 |
| 5.0 | 14.1 | 107 |
| 7.0 | 16.5 | 101 |

EXAMPLE V

Example II is repeated with the exception that about 9.90 grams of $Y_2O_2S:.045$ Eu and 0.1 gram of $Li_2B_2O_4$ or 0.074 gram of $Li_2CO_3$ and 0.124 gram of $H_3BO_3$ are used. The median particle size and brightness of this phosphor are 13.4 micron and 139 respectively.

EXAMPLE VI

Example II is repeated with the exception that about 9.90 grams of $Y_2O_2S:.045$ Eu and 0.1 gram of $Na_2B_4O_7$ or 0.053 gram of $Na_2CO_3$ and 0.123 gram of $H_3BO_3$ are used. The median particle size and brightness of this phosphor are 8.4 micron and 137, respectively.

EXAMPLE VII

Example II is repeated with the exception that about 9.90 grams of $Y_2O_2S:.045$ Eu and 0.1 gram of $K_2B_4O_7$ or 0.86 gram of $KHCO_3$ and 0.105 gram of $H_3BO_3$ are used. The median particle size and brightness are 8.5 micron and 137, respectively.

EXAMPLE VIII

Example VII is repeated with the exception that about 0.1 gram of $Na_2GeO_3$ or 0.064 gram of $Na_2CO_3$ and 0.069 gram of $GeO_2$ are used. The median particle size and brightness are 8.1 micron and 116, respectively.

EXAMPLE IX

Example VII is repeated with the exception that about 0.1 gram of $K_2GeO_3$ or 0.101 gram of $KHCO_3$ and 0.053 gram of $GeO_2$ are used. The median particle size and brightness are 8.1 micron and 112, respectively.

EXAMPLE X

Example VII is repeated with the exception that about 0.1 gram of $Na_2SiO_3$ or 0.087 gram of $Na_2CO_3$ and 0.049 gram of $SiO_2$ are used. The median particle size and brightness are 8.1 micron and 112, respectively.

EXAMPLE XI

Example VII is repeated with the exception that about 0.1 gram of $K_2SiO_3$ or 0.13 gram of $KHCO_3$ and 0.039 gram of $SiO_2$ are used. The median particle size and brightness are 8.2 micron and 107, respectively.

EXAMPLE XII

Example VII is repeated with the exception that 0.1 gram of $Na_2O-B_2O_3-SiO_2$ or 0.055 gram of $Na_2CO_3$, 0.065 gram of $H_3BO_3$ and 0.031 gram of $SiO_2$ are used. The median particle size and brightness are 8.1 micron and 124, respectively.

EXAMPLE XIII

Example VII is repeated with the exception that 0.1 gram of $K_2O-B_2O_3-SiO_2$ or 0.089 gram of $KHCO_3$, 0.055 gram of $H_3BO_3$ and 0.027 gram of $SiO_2$ are used. The median particle size and brightness are 8.3 micron and 115, respectively.

EXAMPLE XIV

Example VII is repeated with the exception that 0.1 gram of $Na_2O-B_2O_3-GeO_2$ or 0.045 gram of $Na_2CO_3$, 0.052 gram of $H_3BO_3$ and 0.044 gram of $GeO_2$ are used. The median particle size and brightness are 8.1 micron and 120, respectively.

EXAMPLE XV

Example VII is repeated with the exception that 0.1 gram of $K_2O-B_2O_3-GeO_2$ or 0.075 gram of $KHCO_3$, 0.046 gram of $H_3BO_3$ and 0.039 gram of $GeO_2$ are used. The median particle size and brightness are 8.1 micron and 112, respectively.

EXAMPLE XVI

A batch of 20.00 grams of $Y_2O_3$:.045 Eu obtained by decomposing coprecipitated yttrium and europium oxalates as described earlier, is mixed with 0.24 grams of lithium borosilicate or 0.11 gram of $Li_2CO_3$, 0.18 gram of $H_3BO_3$ and 0.09 gram of $SiO_2$. The blend is then heated in a stream of nitrogen to displace all air from the furnace. As the temperature of the furnace becomes 700°C, a stream of gaseous hydrogen sulfide is started along with the flowing $N_2$. The furnace is held at 870°C for about an hour to get complete conversion of oxides to oxysulfides. The flow of $H_2S$ is then stopped and the temperature of the furnace is raised to 1150°C with $N_2$ flowing. At 1150°C, the sample is held for four (4) hours. After that, the furnace is cooled down to room temperature with $N_2$ still flowing.

The cold product is ground, sifted through a 400 mesh screen. The resultant phosphor is 11.4 micron in median particle size having a brightness of 144.

It will be apparent from the foregoing description that a new class of luminescent materials has been provided along with novel methods for their preparation having various advantages. It should also be appreciated from the foregoing description that luminescent materials of the present invention can be prepared from different starting materials than herein disclosed, so it is intended to limit the present invention, therefore, only to the scope of the following claims.

What I claim as new and desire to secure by Letters Patent of the United States is:

1. A method of preparing a luminescent material which comprises:

a. blending phosphor crystals having the following chemical composition:

$$Ln_{(2-x)}Ln'_xO_2S$$

wherein Ln is one or more of Y, Gd, La, and Lu, and Ln' is one or more of Dy, Er, Eu, Ho, Nd, Pr, Sm, Tb, and Tm, and x is from 0.0002 to 0.2 with a flux composition selected from a preformed vitreous flux and source materials which form said vitreous flux in situ; said flux composition consisting essentially of an alkali metal oxide selected from the group consisting of lithium, sodium, and potassium oxides together with an oxide selected from the group consisting of $SiO_2$, $GeO_2$, and $B_2O_3$ including mixtures thereof, at a molar ratio between the alkali metal oxide and each of said $SiO_2$, $GeO_2$, and $B_2O_3$ in the flux composition which ranges from 0.5 to 1.0 and 1.0 to 0.5, wherein the weight ratio of the flux composition is from 0.1 to 7 weight percent of the luminescent material, and b. firing the blended product in the approximate temperature range 1000°C–1350°C in an inert atmosphere for a sufficient time period to recrystallize the phosphor crystals having uniformly dispersed therein the vitreous flux.

2. A method as in claim 1 wherein the vitreous flux is preformed by heating the flux composition at a temperature of at least 500°C for a sufficient time period to form a heat reaction product containing vitreous phase and blending said vitreous flux with the phosphor crystals.

3. A method of preparing a luminescent material which comprises:

a. heating a rare-earth oxide mixture with a sulfurizing agent to an elevated temperature of at least about 700°C until oxysulfide phosphor crystals are formed, said phosphor crystals having the following chemical composition:

$$Ln_{(2-x)}Ln'_xO_2S$$

wherein Ln is one or more of Y, Gd, La and Lu, and Ln' is one or more of Dy, Er, Eu, Ho, Nd, Pr, Sm, Tb, and Tm, and x is from 0.0002 to 0.2, b. cooling the phosphor crystals and blending said crystals with a flux composition selected from a preformed vitreous flux and source materials which form said vitreous flux in situ; said flux composition consisting essentially of an alkali metal oxide selected from the group consisting of lithium, sodium, and potassium oxides together with an oxide selected from the group consisting of $SiO_2$, $GeO_2$, and $B_2O_3$ including mixtures thereof, at a molar ratio between the alkali metal oxide and each of said $SiO_2$, $GeO_2$, and $B_2O_3$ in the flux composition which ranges from 0.5 to 1.0 and 1.0 to 0.5, wherein the weight ratio of the flux composition is from 0.1 to 7 weight percent of the luminescent material, and c. firing the blended product in the approximate temperature range 1000°C–1350°C in an inert atmosphere for a sufficient time period to recrystallize the phosphor crystals having uniformly dispersed therein the vitreous flux.

4. A method as in claim 3 wherein the vitreous flux is preformed by heating the flux composition at a temperature of at least 500°C for a sufficient time period to form a heat reaction product containing vitreous phase.

* * * * *